United States Patent
Minkus

[19]

[11] Patent Number: 5,941,541
[45] Date of Patent: Aug. 24, 1999

[54] MULTI-FUNCTIONAL FOLDABLE SLED

[76] Inventor: Daniel J. Minkus, 2003 7th Ave., Beaver Falls, Pa. 15010

[21] Appl. No.: 09/002,338

[22] Filed: Jan. 2, 1998

[51] Int. Cl.⁶ ..................................................... B62B 9/04
[52] U.S. Cl. ............................................. 280/20; 280/28
[58] Field of Search ............................. 280/20, 14.1, 15, 280/18, 19, 28; 285/120.1, 130.1

[56] References Cited

U.S. PATENT DOCUMENTS

| | | | |
|---|---|---|---|
| 339,368 | 4/1886 | Black et al. | 285/130.1 |
| 408,826 | 8/1889 | Conroy | 285/130.1 |
| 494,671 | 4/1893 | Dudley-Cooper | 285/130.1 |
| 548,998 | 9/1895 | Mannesmann | 285/130.1 |
| 1,075,281 | 10/1913 | Anderson | 285/130.1 |
| 2,469,765 | 5/1949 | Fish | 280/18 |
| 2,627,422 | 2/1953 | Pagelkopf | 280/18 |
| 2,673,744 | 3/1954 | Johnson | 280/20 |
| 2,783,052 | 2/1957 | Wall | 280/20 |
| 3,034,799 | 5/1962 | Conover | 280/18 |
| 3,625,533 | 12/1971 | Boe | 280/18 |
| 3,957,292 | 5/1976 | Diggs | 285/130.1 |
| 3,982,748 | 9/1976 | Hooper et al. | 280/18 |
| 4,265,045 | 5/1981 | Garbini | 42/94 |
| 4,294,457 | 10/1981 | Thiboutot | 280/20 |
| 4,561,665 | 12/1985 | McFrisby | 280/20 |
| 4,573,695 | 3/1986 | Kennel | 280/20 |
| 4,776,124 | 10/1988 | Clifton | 42/94 |
| 4,909,524 | 3/1990 | Paine | 280/18 |
| 4,967,497 | 11/1990 | Yakscoe | 42/94 |
| 5,013,066 | 5/1991 | Adkins | 280/809 |
| 5,284,280 | 2/1994 | Stonebraker, Sr. et al. | 224/153 |
| 5,553,875 | 9/1996 | Ulicne et al. | 280/20 |
| 5,740,625 | 4/1998 | Jenkins | 42/94 |

*Primary Examiner*—Lanna Mai
*Assistant Examiner*—Andrew J. Fischer

[57] ABSTRACT

A Multi-functional foldable sled including a body portion with a front section, a rear section and a middle section. The front section and the middle section have a front hinge therebetween for pivotal coupling. The rear section and the middle section have a rear hinge therebetween for pivotal coupling. Provided are a pair of rear runners with each rear runner having a rear pole support exteriorly mounted thereon. A pair of front runners are included and each of the pair of front runners having a front pole support exteriorly mounted thereon. Finally, a pair of elongated pole members are provided. Each one of the pair of pole members is positioned within one of the rear pole supports and one of the front pole supports for allowing the body member to transport the pair of pole members.

1 Claim, 2 Drawing Sheets

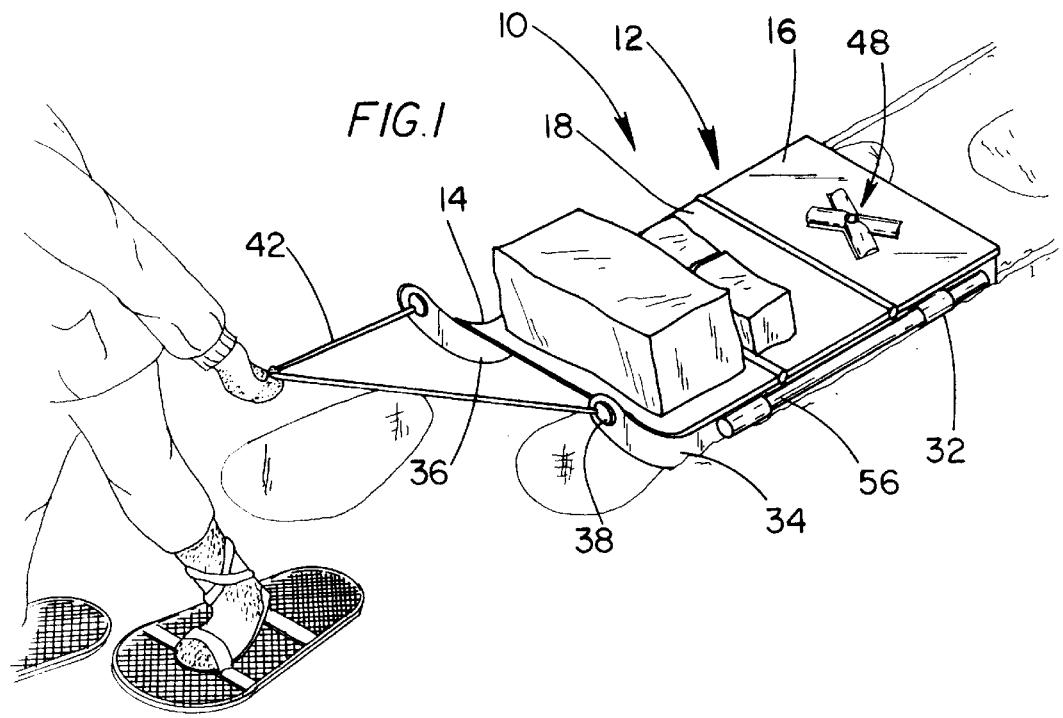
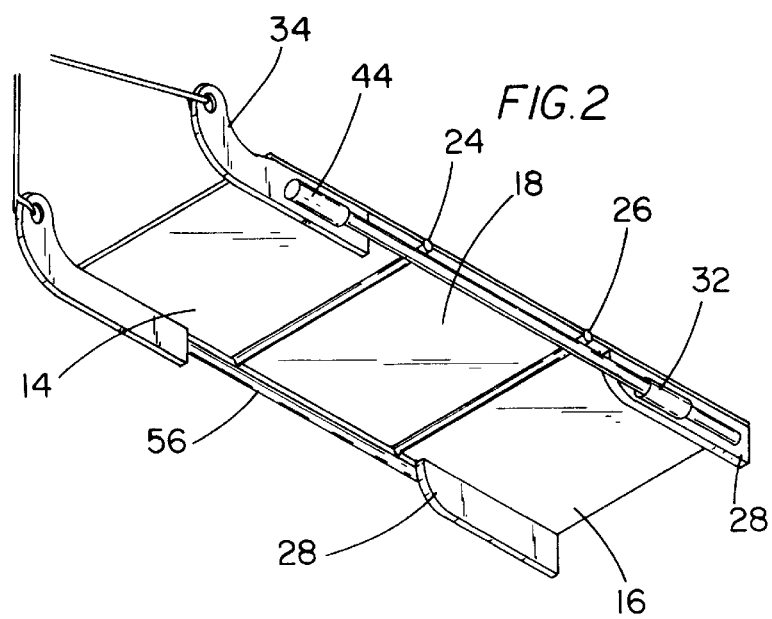

MULTI-FUNCTIONAL FOLDABLE SLED

BACKGROUND OF THE INVENTION

1. Field of the Invention

The present invention relates to a multi-functional foldable sled and more particularly pertains to providing a transportation device for a hunter and one that incorporates other functional articles for use by the hunter.

2. Description of the Prior Art

The use of a sled is known in the prior art. More specifically, Sleds heretofore devised and utilized for the purpose of transporting articles over the snow are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,295,556 to Mullin discloses a multipurpose hunting cart. U.S. Pat. No. 4,561,665 to McFrisby discloses a collapsible shed apparatus, and methods of constructing and utilizing same. U.S. Pat. No. 4,373,737 to Cory et al. discloses a game carrier. U.S. Pat. No. 4,321,982 to Strickland discloses a tree climbing-hunting and game cart device. U.S. Pat. No. 3,912,290 to Rich discloses a collapsible sled. Lastly, U.S. Pat. No. Des. 283,112 to McFrisby discloses an articulated, collapsible sled.

In this respect, the multi-functional foldable sled according to the present invention substantially departs from the conventional concepts and designs of the prior art, and in so doing provides an apparatus primarily developed for the purpose of providing a transportation device for a hunter and one that incorporates other functional articles for use by the hunter.

Therefore, it can be appreciated that there exists a continuing need for a new and improved multi-functional foldable sled which can be used for providing a transportation device for a hunter and one that incorporates other functional articles for use by the hunter. In this regard, the present invention substantially fulfills this need.

SUMMARY OF THE INVENTION

In view of the foregoing disadvantages inherent in the known types of sleds now present in the prior art, the present invention provides an improved multi-functional foldable sled. As such, the general purpose of the present invention, which will be described subsequently in greater detail, is to provide a new and improved multi-functional foldable sled which has all the advantages of the prior art and none of the disadvantages.

To attain this, the present invention essentially comprises a generally rectangular body portion. The body portion has a front section, a rear section and a middle section. The front section and the middle section have a front hinge for pivotal coupling. The rear section and the middle section have a rear hinge for pivotal coupling. The middle section is pivotal about 180 degrees along the front hinge with respect to the front section. The rear section is pivotal about 180 degrees along the rear hinge with respect to the middle section.

Included are a pair of rear runners. One of each rear runner is fixedly attached to opposite sides of the rear section. Each rear runner has a generally cylindrical rear pole support exteriorly mounted thereto. Also, a pair of front runners are provided. Each front runner has a curved end portion. Each curved end portion has a rope hole for allowing a tow rope to be tied onto. Each of the pair of front runners has a generally cylindrical front pole support exteriorly mounted thereto. A quad positioner is formed by a pair of hollow cross arms. The quad positioner is releasably mounted to the rear section of the body portion. The quad positioner has a pin for allowing rotation of the pair of hollow cross arms.

Lastly, a pair of elongated pole members are provided. Each one of the pair of pole members is positioned within one of the rear pole supports and one of the front pole supports to allow the body member to transport the pair of pole members. Each of the pair of pole members is sized and has an end positioned within one of the hollow cross arms of the quad positioner, when removed from the rear and front pole supports. The pair of pole members form a rifle support when each is positioned within the quad positioner.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multi-functional foldable sled which has all the advantages of the prior art Sleds and none of the disadvantages.

It is another object of the present invention to provide a new and improved multi-functional foldable sled which may be easily and efficiently manufactured and marketed.

It is a further object of the present invention to provide a new and improved multi-functional foldable sled which is of a durable and reliable construction.

An even further object of the present invention is to provide a new and improved multi-functional foldable sled which is susceptible of a low cost of manufacture with regard to both materials and labor, and which accordingly is then susceptible of low prices of sale to the consuming public, thereby making such multi-functional foldable sled economically available to the buying public.

Still yet another object of the present invention is to provide a new and improved multi-functional foldable sled which provides in the apparatuses and methods of the prior art some of the advantages thereof, while simultaneously overcoming some of the disadvantages normally associated therewith.

Still another object of the present invention is to providing a transportation device for a hunter and one that incorporates other functional articles for use by the hunter.

Lastly, it is an object of the present invention to provide a new and improved sled that has a generally rectangular body portion with a front section, a rear section and a middle section. The front section and the middle section have a front hinge therebetween for pivotal coupling. The rear section and the middle section have a rear hinge therebetween for pivotal coupling. Provided are a pair of rear runners with each rear runner having a generally cylindrical rear pole support exteriorly mounted thereon. A pair of front runners are included and each of the pair of front runners having a generally cylindrical front pole support exteriorly mounted thereon. Finally, a pair of elongated pole members are provided. Each one of the pair of pole members is positioned within one of the rear pole supports and one of the front pole supports for allowing the body member to transport the pair of pole members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the multi-functional foldable sled constructed in accordance with the principles of the present invention.

FIG. 2 is an isometric bottom view of the present invention of FIG. 1.

Similar reference characters refer to similar parts throughout the several views of the drawings.

DESCRIPTION OF THE PREFERRED EMBODIMENT

Figure 3:
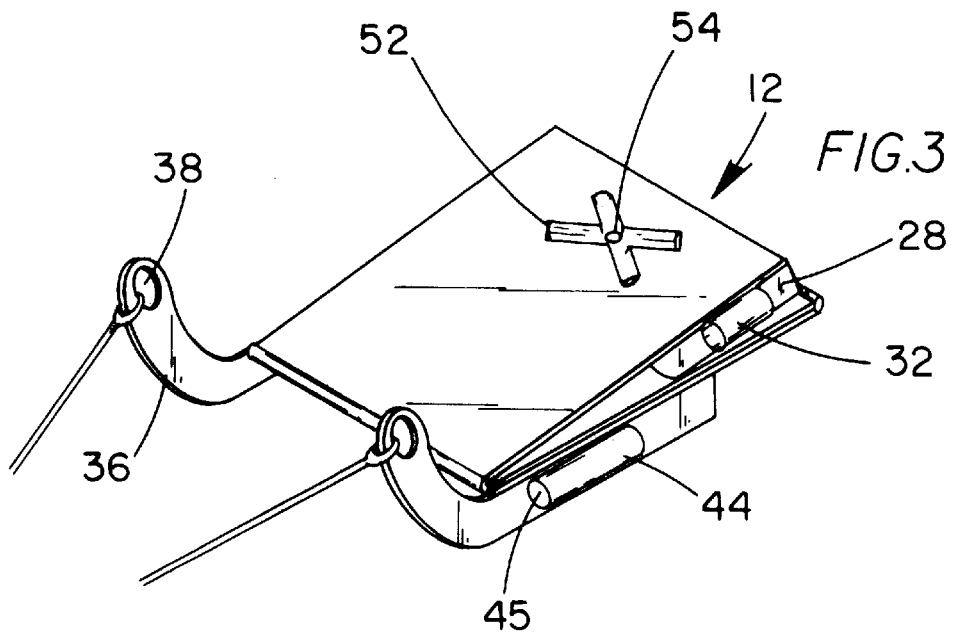
FIG. 3 is an isometric view of the present invention in a folded orientation.

With reference now to the drawings, and in particular to FIG. 1 thereof, a new and improved multi-functional foldable sled embodying the principles and concepts of the present invention and generally designated by the reference numeral 10 will be described.

The present invention, the new and improved Multi-functional foldable sled, is comprised of a plurality of components. Such components in their broadest context include a body portion, a pair of poles and a quad positioner. Such components are individually configured and correlated with respect to each other so as to attain the desired objective.

More specifically, the present invention includes a generally rectangular body portion 12. The body portion, as seen in FIG. 2, has a front section 14, a rear section 16 and a middle section 18. The front section and the middle section have a front hinge 24 for pivotal coupling. The rear section and the middle section have a rear hinge 26 for pivotal coupling. Each hinge is a piano type hinge. The middle section is pivotal about 180 degrees along the front hinge with respect to the front section. The rear section is pivotal about 180 degrees along the rear hinge with respect to the middle section. FIG. 3 is an illustration of the body portion as it looks folded.

Included are a pair of rear runners 28. One of each rear runner, as seen in FIG. 2, is fixedly attached to opposite sides of the rear section. Each rear runner has a generally cylindrical rear pole support 32 exteriorly mounted thereon. Each of the rear pole supports are hollow with openings at each end.

Also, a pair of front runners 34 are provided. As shown in FIG. 1, each front runner has a curved end portion 36. Each curved end portion has a rope hole 38. The rope hole allows a tow rope 42 to be tied onto each front runner. Each of the pair of front runners has a generally cylindrical front pole support 44 exteriorly mounted thereon. Each of the front pole supports has a closed end 45. Each of the front pole support may have a threaded interior.

Figure 4:
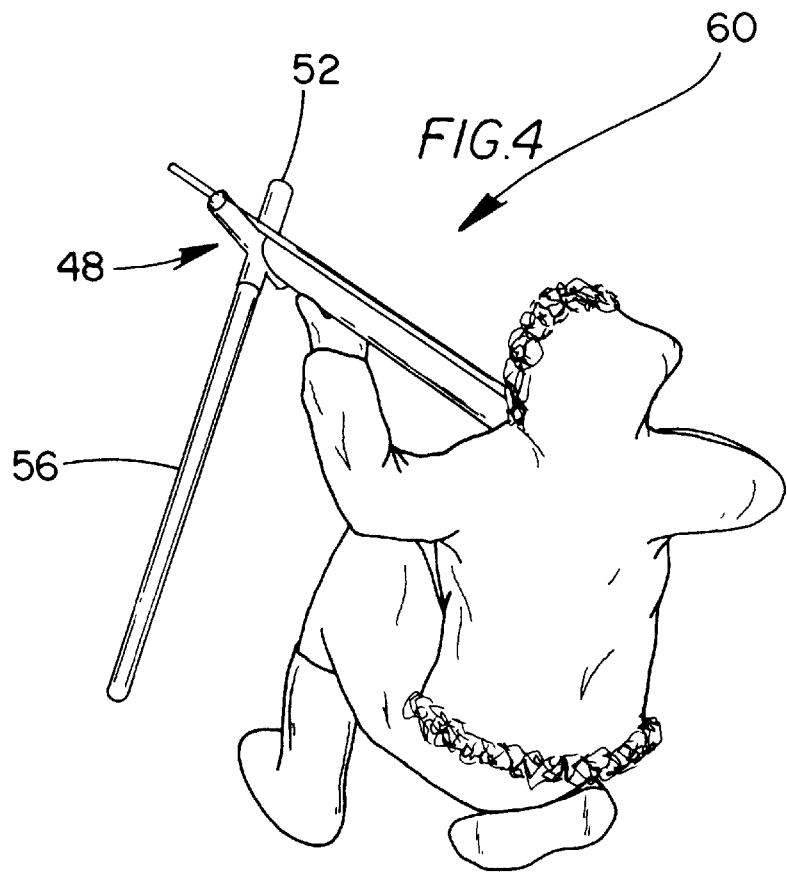
FIG. 4 is a perspective illustration of the pole member coupled to the quad positioner.

As best illustrated in FIG. 4, a quad positioner 48 is provided. The quad positioner is formed by a pair of hollow cross arms 52. The quad positioner is releasably mounted to the rear section of the body portion, as depicted in FIG. 1. The quad positioner has a pin 54 for allowing rotation of the pair of hollow cross arms.

Lastly, a pair of elongated pole members 56 are provided. Each pole member is aluminum. Each one of the pair of pole members is positioned within one of the rear pole supports 32 and one of the front pole supports 44 to allow the body member to transport the pair of pole members. Each of the pair of pole members is sized and has an end positioned within one of the hollow cross arms of the quad positioner 48. The poles are positioned within the quad positioner when they are removed from the rear and front pole supports.

Furthermore, the pair of pole members form a rifle support, known as a bi-pod 60, when each is positioned within the quad positioner. Because the quad positioner is rotatable about the pin the bi-pod's height is adjustable. FIG. 4 is an illustration of the bi-pod in use. The poles may have a threaded end for engaging the threaded interior of the respective front pole support. When the threaded end is used with the threaded interior of the pole support, each pole is secured about the body portion.

The present invention multi-functional foldable sled is specially structured to for deer drag/transport. The poles when removed from the pole supports may be used with the bi-pod or as walking sticks. Each of the sections of the body portion is eighteen square inches. Each section has a diameter of one inch. Each of the poles is thirty-six inches. The front and rear runners, along with the front and rear pole supports, are each formed of a rigid plastic.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-functional foldable sled for transporting articles comprising in combination:

a generally rectangular body portion having a front section, a rear section and a middle section, the front section and the middle section having a front hinge therebetween for pivotal coupling, the rear section and the middle section having a rear hinge therebetween for pivotal coupling, the middle section being pivotal about 180 degrees along the front hinge with respect to the front section, the rear section being pivotal about 180 degrees along the rear hinge with respect to the middle section;

a pair of rear runners with one of each runner being fixedly attached to opposite sides of the rear section, each rear runner having a generally cylindrical rear pole support exteriorly mounted thereto;

a pair of front runners each having a curved end portion, each curved end portion having a rope hole for allowing a tow rope to be tied thereon, each of the pair of front runners having a generally cylindrical front pole support exteriorly mounted thereto;

a quad positioner formed by a pair of hollow cross arms being releasably mounted to the rear section of the body portion, the quad positioner having a pin for allowing rotation of the pair of hollow cross arms thereabout; and a pair of elongated pole members, each one of the pair of pole members being positioned within one of the rear pole supports and one of the front pole supports for allowing the body member to transport the pair of pole members, each of the pair of pole members being sized for having an end selectively positioned within one of the hollow cross arms of the quad positioner when removed from the rear and front pole supports, the pair of pole members selectively forming a rifle support when each being positioned within the quad positioner.

\* \* \* \* \*